US 7,840,946 B2

(12) United States Patent
Gupta et al.

(10) Patent No.: US 7,840,946 B2
(45) Date of Patent: Nov. 23, 2010

(54) SYSTEM AND METHOD FOR MATCHING A PLURALITY OF ORDERED SEQUENCES WITH APPLICATIONS TO CALL STACK ANALYSIS TO IDENTIFY KNOWN SOFTWARE PROBLEMS

(75) Inventors: Rajeev Gupta, New Delhi (IN); Guy Maring Lohman, San Jose, CA (US); Tanveer Fathima Mahmood, Cupertino, CA (US); Laurent Sebastien Mignet, New Delhi (IN); Natwar Modani, New Delhi (IN); Mark Francis Wilding, Barrie (CA)

(73) Assignee: International Business Machines Corporation, Armonk, NY (US)

( * ) Notice: Subject to any disclaimer, the term of this patent is extended or adjusted under 35 U.S.C. 154(b) by 1209 days.

(21) Appl. No.: 11/422,023

(22) Filed: Jun. 2, 2006

(65) Prior Publication Data

US 2007/0283338 A1 Dec. 6, 2007

(51) Int. Cl.
*G06F 9/44* (2006.01)
(52) U.S. Cl. .................................................. 717/124
(58) Field of Classification Search ................ None
See application file for complete search history.

(56) References Cited

U.S. PATENT DOCUMENTS

| | | | |
|---|---|---|---|
| 5,752,019 A | 5/1998 | Rigoutsos et al. | |
| 6,675,295 B1 | 1/2004 | Marcelais et al. | |
| 6,681,348 B1 | 1/2004 | Vachon | |
| 6,816,984 B1 | 11/2004 | Snyder et al. | |
| 6,845,470 B2 | 1/2005 | Austen et al. | |
| 6,895,366 B2 | 5/2005 | Izuoka et al. | |
| 6,910,160 B2 | 6/2005 | Bajoria et al. | |
| 7,024,592 B1 | 4/2006 | Voas et al. | |
| 2004/0255163 A1 | 12/2004 | Swimmer et al. | |
| 2005/0027717 A1 | 2/2005 | Koudas et al. | |

OTHER PUBLICATIONS

Mark Brodie et al., "Automated Problem Determination Using Call-Stack Matching", Jun. 2005, Journal of Network and Systems Management, vol. 13, No. 2.*
Alfred V. Aho et al., "Efficient String Matching: An Aid to Bibliographic Search", Jun. 1975, Communications of the ACM, vol. 18, No. 6.*

(Continued)

*Primary Examiner*—Wei Y Zhen
*Assistant Examiner*—Lanny Ung
(74) *Attorney, Agent, or Firm*—Brian Lambert; Shimokaji & Assoc.

(57) ABSTRACT

The invention finds matches in ordered sequences, e.g. program function call stacks from anomalous software program executions for discovering related or identical software flaws and possible known solutions. Call stacks are matched after removing recursive and uninformative subpatterns, e.g. names of common error handling routines, to see if they were generated due to the same possibly known problem. Sequences statistically unlikely to be matches are pruned from the search. Matches found earlier in the sequences may be weighted differently, e.g. to be more important in call stacks, than other matches. Sequences are indexed so that those relevant to a query are identified automatically without detailed exhaustive search. Maximum matches are found by optimizing a cost function based on weighted sequence similarity.

19 Claims, 8 Drawing Sheets

OTHER PUBLICATIONS

Mark Brodie et al., "Quickly Finding Known Software Problems via Automated Symptom Matching", IEEE International Conference on Autonomic Computing (ICAC), 2005.

Michael Buckley and Ram Chillarege, "Discovering relationships between service and customer satisfaction", IEEE International Conference on Software Maintenance (ICSM), 1995.

Levenshtein V.I., "Binary codes capable of correcting deletions, insertions and reversals", Soviet Physics Doklady 10 (8), pp. 707-710.

Brodie, M., Ma, S., Rachevsky, L, and Champlin, J., "Automated Problem Determination using Call-Stack Matching", Journal of Network and Systems Management, special issue on self-managing systems, Jun. 2005.

Feng, H. H., Kolesnikov, 0., Fogla, P., Lee, W. and Gong, W., "Anomaly Detection Using Call Stack Information", Proceedings of the 2003 IEEE Symposium on Security and Privacy, 2003, p. 62.

Lambert J. and Podgurski, A., "xdProf: A Tool for the capture and analysis of stack traces in a distributed Java system", International Society of Optical Engineering (SPIE) Proceedings, vol. 4521, 2001, p. 96-105.

Acorn, T., and Walden, S., SMART: Support Management Reasoning Technology for Compaq Customer Service, Innovative Applications of Artificial Intelligence, vol. 4, 1992.

Li, T., Zhu, S., and Ogihara, M., Mining Patterns from Case Base Analysis, Workshop on Integrating Data Mining and Knowledge Management, 2001.

Navarro G. et ai, "Indexing Methods for Approximate String Matching", Bulletin of the IEEE Computer Society Technical Committee on Data Engineering, 2001.

Altschul S.F., W. Gish, W. Miller, E. W. Myers, and D. J. Lipman, "Basic local alignment search tool," J. Molecular Biology 15 (1990), 403-410.

* cited by examiner

FIGURE 1

Importance of functions reduces as we go down the stack

```
sqlzeDumpFFDC
sqlzeSqlCode
sqlnn_erds
sqlno_prop_pipe
PIPE
sqlno_crule_pipe_root
sqlno_crule_pipe
sqlno_plan_qun
sqlno_call_sf
sqlno_each_opr
sqlno_call_sf
sqlno_walk_qun
sqlno_call_sf
sqlno_each_opr
sqlno_call_sf
sqlno_walk_qun
sqlno_call_sf
sqlno_each_opr
sqlno_call_sf
sqlno_walk_qun
sqlno_call_sf
sqlno_each_opr
sqlno_call_sf
```

FIGURE 3B

```
sqlzeDumpFFDC
sqlzeSqlCode
sqlnn_erds
sqlno_prop_pipe
PIPE
sqlno_crule_pipe_root
sqlno_crule_pipe
sqlno_plan_qun
sqlno_call_sf
```

FIGURE 4

```
removeRecusion(stack)
    for i=1:stack_length
        for j=stack_length:i+1
            if (si = sj)
                newStack= concat(stack(1:i), stack(j+1, stackLength))
                removeRecusion(newStack)
            endif
        endfor
    endfor
end
```

FIGURE 5

```
topKIndexer(queryStack)
    kMax = Maximum number of function names to consider
    nMin= Minimum number of stacks to return
    for i = 1 to kMax
        n= number of stored stacks with same top-i functions
        if(n < nMin)
            if (i== 1)
                k=1
            else
                k=i-1
    return all stacks with same top-k functions
```

SYSTEM AND METHOD FOR MATCHING A PLURALITY OF ORDERED SEQUENCES WITH APPLICATIONS TO CALL STACK ANALYSIS TO IDENTIFY KNOWN SOFTWARE PROBLEMS

FIELD OF THE INVENTION

This invention relates to matching ordered sequences. Specifically, in a typical usage scenario the invention processes program call stacks to automatically discover whether program execution difficulties were caused by the same software flaw, for which a bugfix or other customer workaround may be readily available.

RELATED ART

These articles are hereby incorporated by reference in their entirety and are attached as an Appendix as part of this specification:
  T. Syeda-Mahmood, G. Lohman, G. Shah, L. Mignet, N. Modani, M. Brodie, S. Ma. "Searching Ordered Function Call Sequences for Discovering Related Diagnostic Problem Definitions".
  N. Modani, R. Gupta, L. Mignet, T. Syeda-Mahmood, G. Lohman. "Known Software Problem Identification: Architecture, Algorithms and Performance".
  M. Brodie, S. Ma, G. Lohman, L. Mignet, N. Modani, M. Wilding, J. Champlin, P. Sohn. "Quickly Finding Known Software Problems Via Automated Symptom Matching", Proceedings of the Second International Conference on Autonomic Computing (ICAC 2005), 13-16 Jun. 2005, p. 101-110.

BACKGROUND OF THE INVENTION

This invention addresses the problem of matching of general ordered sequences of symbols. Addressing this problem is important in many areas. For example, future enterprise search will accept large document queries instead of a few keywords, and would need to exploit the order in query keywords to find more meaningful matches. Both the documents and the queries can then be modeled as ordered sequences. Similarly, ordered sequence matching is a common operation in biological sequence alignment in bioinformatics, particularly for multiple gene sequence alignment.

Diagnosing software problems that are reported to customer support is costly in terms of skilled labor costs. However, typically half, and sometimes as much as 90 percent, of all problems reported by users are actually re-occurrences or rediscoveries of known problems. While such statistics may seem encouraging, customer support staffs spend a significant amount of time to manually determine whether or not a reported problem is already known. Automated techniques for discovering similarities in reported problem descriptions can therefore significantly reduce support costs and are thus needed. Furthermore, this approach does not demand that customer support staff have substantial software engineering skills, thereby decreasing the required resource costs.

Inferring relationships from the natural language descriptions of problem reports, however, is a challenging problem that is beyond the scope of current natural language understanding technology. Fortunately, the problem reports often contain structured diagnostic information that is automatically generated by the troubled software components. Such information is more amenable to automated matching than semi-structured or unstructured symptom descriptions provided by humans.

Automated problem determination can be made possible by matching program failure signatures such as call stacks. Call stack traces are the most prevalent type of information collected by software system in case of a system hang or a crash. Call stacks reconstruct the sequence of function calls leading up to the failure via the operating system's stack of addresses that is pushed each time a function is called and popped when it returns. These stack traces provide the function name and line number or offset where the crash occurred (in case of crash) along with the function path through which that call was made. The information about the line number or offset is not reliable, however, as these tend to differ from platform to platform (for offset) or from one version to another (for line numbers). Also, the parameter values are not available on all platforms for all types of parameters.

Call stacks are good indicators of problem descriptions because a single problem is characterized by a small, if not unique, set of call stack appearances. Typically, if two execution problems have the same origin, they should have the same function name on the top of the stack. If two call stacks have the same function name at the top of the stack, they are likely to be due to the same problem, although there is a possibility that there may be more than one error in the function which is at the top of the stack. While it is possible that the same problem can be manifested by very different call stacks, it is unlikely that two very similar call stacks correspond to widely different problem descriptions. Thus, finding matching call stacks can provide useful structured information for automatic problem determination.

The problem of call stack matching for identifying known problems was first addressed in [02]. This reference established the efficacy of call stack matching for known problem determination. It also introduced the need for recursion removal, identifying uninformative function names, and proposed the LCS algorithm which is evaluated herein. However, most of the discussion in this paper was qualitative with little experimental results presented.

Call stack matching for known problem determination was also reported in [4]. However, the authors do not provide means to identify uninformative functions or to account for the recursive function calls, though a matching algorithm that finds the single longest common subsequence of function names is provided. The authors also proposed a learning scheme for the matching purpose, which tries to determine a 'signature' of the problem by looking at all the stacks corresponding to one problem, and identify the common part of such stacks. Their performance results are unfortunately presented for only a very small data set.

Call stacks have been analyzed for other purposes. In [5], the call stack information is used to develop an anomaly detection algorithm for intrusion detection. The collection of Java stack traces in a distributed environment is described in [6] and various techniques for comparing the call stacks are discussed.

The general idea of solving problems by matching symptoms against a historical database is also a well-known technique, known as case-based reasoning (CBR). It has been applied to customer support and help desk situations [7, 8], but these approaches try to find similarities in the problem report information supplied by users, not at the program execution level. They typically do not consider call stacks or the approach of looking for sequences in the data. An automated method of matching ordered sequences for call stack analysis applications is therefore needed.

SUMMARY OF THE INVENTION

It is accordingly an object of this invention to provide a system, method, service, and computer program product for matching ordered sequences that takes into account recursion, positional information, discriminability and extent of displacement of symbols. The invention efficiently searches through the collection of ordered sequences through an indexing method called function hashing, which records statistics about occurrences of symbols in sequences and uses the histogram of hits to query symbols to prune candidate matches. The indexing method reduces search with increases in precision but without significantly affecting recall during matching.

The invention first filters the sequences to remove recursion. Then the best global alignment between such normalized sequences is found as the maximum match consisting of the largest number of residues, i.e. subsequences of one sequence that can be matched to the other while allowing for all possible gaps using a dynamic programming algorithm. In the assembly of matches from sub-matches, the invention builds a cost function by considering three independent factors, namely, (a) the importance of the symbol, (b) the position of the query symbol from the top of sequence, and (c) the extent of the gap between a particular symbol in the query sequence and a particular symbol in the candidate sequence.

The method of indexing pre-processes function information from sequences and uses the query sequence symbols to prune the list of candidates. Specifically, a hash table is created that records all sequences in which a symbol occurs. To find candidate matches to a query sequence, all query symbols are used to lookup the hash table and the hit count for each sequence so indexed is updated. The peaks in the histogram of hits indicate candidate matching sequences. In fact, the highest peak reflects an upper bound on the size of the matching that can be obtained during alignment.

In an exemplary embodiment, the system is a general purpose computer with means for carrying out the inventive method steps as executable program steps, as may be tangibly embodied upon a computer-readable medium comprising a computer program product. The invention may also constitute a service that can be accessed and enabled for a fee, for example as part of a customer support call center operation or help desk.

The foregoing objects are believed to be satisfied by the exemplary embodiments of the present invention as described below.

DETAILED DESCRIPTION OF THE INVENTION

Figure 1:
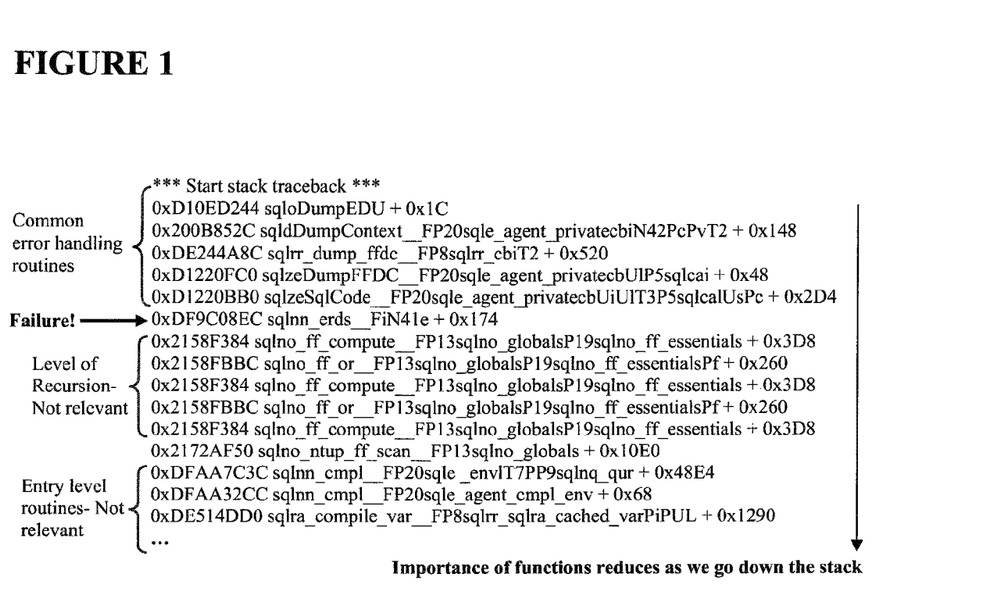
FIG. 1 is a diagram of a typical C++ call stack and its characteristics.

Referring now to FIG. 1, a typical C++ call stack from IBM DB2® is shown, illustrating its characteristics ("DB2" is a registered trademark of the IBM Corporation). Each line in the stack trace begins with a hex number denoting the function's address in the memory, followed by the function name separated by two underscores from the C++ "mangled" names of the arguments of that function, and finally the offset of the instruction from the start of the function. The top of the stack is the name of deepest function in the call flow and the bottom of the stack is the entry point function name. By coding convention, whenever an error or exception is detected, some error handling functions are invoked to handle the error. Hence, the top few functions in the call stack are typically error handling functions, which do not provide information about the nature of the problem. We call these uninformative functions. On the other hand, since the bottom of the stack is the entry point which would be common across a large number of stacks, it does not provide very useful information about the nature of the problem, either. There may be recursive calls to some functions in the call stack. However, if a function appears multiple times in the call-stack then whatever happens between two calls to that function may not be important from the problem determination point of view. Hence, before matching the call stacks, we need to remove uninformative function names and the recursive function calls from the call stacks.

We address the problem of finding similar call stacks to enable retrieval of similar problems and their associated solutions which were reported to the service organization earlier, keeping in mind the above mentioned characteristics of the call stacks. When a new problem arrives, we use the call stack matching algorithms, presented here, to measure similarity between the given call stack and the set of previously reported call stacks to search for the problem resolution.

We present algorithms for various components of stack matching along with their performance. Specifically, we present algorithms for stack matching, recursion removal, indexing and uninformative function identification. The performance results show that our algorithms perform better than previously known ones.

Usage Scenario

We now describe the scenarios in which call-stack matching schemes can be used, as well as a prototype system implementation for the purpose of performance evaluation. As mentioned earlier, call stack matching can be seen as first effort towards identifying already known problems from problem symptoms. It can be used in help desk scenarios as well as in autonomic computing settings.

In the help desk scenario, service centers handle customer calls regarding wide range of problems from information queries and configuration related problems, to defects in the code. Typically, these calls are handled by a three level service organization: the first level (L1) opens a problem management record (PMR) for each customer problem and does a quick "keyword based" search for known problems; when the L1 can not readily provide the resolution, the PMR is assigned to level 2 (L2) support, who are more specialized personnel with in-depth knowledge on particular products, called as subject matter expert (SME); if they are not able to solve the problem then an authorized program analysis report (APAR) is opened and the problem is passed to level 3 (L3, the developers). APAR is IBM parlance for code or documentation defect [01]. Once the problem is solved, the APAR is closed. By having efficient call stack matching algorithms, we can identify previously reported PMRs and corresponding APARs with less human effort resulting in saving of costly skilled manpower.

Figure 2:
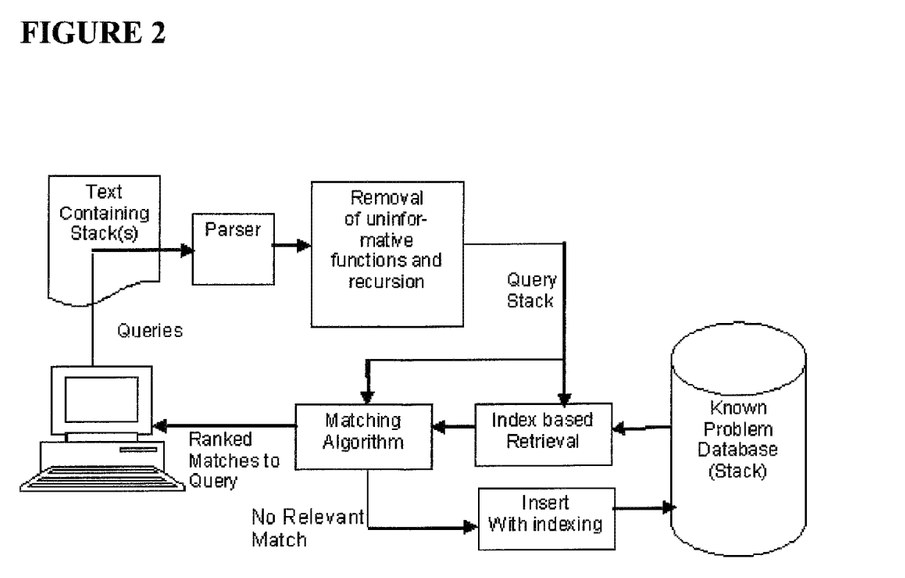
FIG. 2 is a diagram of a prototype system architecture, according to an embodiment of the invention.

Referring now to FIG. 2, the typical implementation of the call-stack matching scheme is shown. Our prototype is implemented using Java 1.4, running over IBM DB2 v8.1 database as stack repository. (Java® is a registered trademark of SUN Microsystems). The call stacks from the previously reported PMRs are stored in the repository. The newly arriving problem description is parsed by the parser to extract the call stack and create a sequence of function names as the output. Recursion and uninformative functions were removed using the schemes proposed below, to get a normalized stack. This normalized stack is used for searching similar stacks from the stack repository. If the query stack is not identical to any of the stack in the list, it may be inserted into the repository so that is can be used in the future searches.

Since the number of stacks in the repository can be huge, we create indices to search them efficiently. An index is computed for the normalized query stack which is used to extract a number of stacks that are likely to match with the query call stack from the repository. These candidate stacks are sent as input to the matching algorithm. Algorithms for index computation as well as stack matching are described below. The matching algorithm assigns a similarity score to each candidate stack with respect to the query stack. These matching scores are used to generate a ranked list of related stacks. We may use either a threshold to select the best matching stacks or a fixed number of stacks as output of the matching scheme.

In the help-desk scenario the L1 support person may get a list of 3-5 PMRs as the most likely matches for a given query stack. By inspecting these PMRs, the L1 person can determine if the list contains a PMR similar to the query PMR and suggest APAR to be applied accordingly.

The other scenario where the stack matching may be applied is autonomic systems. The aim of autonomic systems is to remove the need of human intervention from the system management. Self-healing is one of the desired aspect of autonomic systems. Identifying known problems is one step towards the goal of self-healing systems. By having previously known symptom database and, a symptom identification process the system can automatically download software patches to fix the code defects. In this scenario, it is important that false positives are minimized as the system lacks the module corresponding to an L1 person to identify and filter them.

Stack Matching

As explained earlier, call stack similarity is a good indicator of problem reoccurrence. We now present measures and algorithms for call stack matching. These algorithms can be seen as variants of string matching algorithms with modification to exploit the particular characteristics of the normalized call stacks mentioned above. Our first algorithm is based on edit distance, a popular string matching technique. The second algorithm discussed here is a variant of LCS approach for string matching, originally proposed in [02]. Finally, we present a new algorithm, prefix match, for stack matching which is faster then both the edit distance and LCS based algorithms. All these algorithms assign a similarity score to a given stack pair ranging between 0 for 'no match' to 1 for 'identical'. These scores are used to select the subset of the call stacks which are deemed to be similar to the query call stack. We call the matching based on these similarity measures as the matching algorithms.

We introduce some notations here. We will represent the query stack by S and a stack from repository as T. The stack consisting of sequence of first i function names from a stack Q is represented as $Q_i$. Also, the $i^{th}$ function name in the stack Q is denoted by $q_i$.

Edit Distance

Edit distance is a popular measure for string similarity [3]. Here we treat each function name in the call stacks as a single symbol and define the edit distance between the two call stacks as the number of edit operations (add, delete, replace) that are needed to convert the first call stack into the second call stack. The edit distance between two call stacks S and T, can be defined in a recursive fashion as follows, using the notation defined above:

$$D_w(S_i, T_j) = \min\{D_w(S_{i-1}, T_{j-1}) + w(s_i, t_j), D_w(S_{i-1}, T_j) + w(s_i, \phi), D_w(S_i, T_{j-1}) + w(\phi, t_j)\} \quad (1)$$

where $\phi$ represents the 'blank' (i.e., the edit operation is delete). $D_w$ is the edit distance between the two call stacks and w is the distance between two function names. We take $w(s_i, t_j) = 0$ if the two function names (denoted by $s_i, t_j$) are same and 1 otherwise. This definition is amenable to a dynamic programming formulation. Now we define the similarity score between S and T as:

$$S_E(S, T) = \frac{\max(|S|, |T|) - D_w(S, T)}{\max(|S|, |T|)} \quad (2)$$

where $|S|$ is the length of the call stack S. Clearly, $0 <= S_E(S, T) <= 1$. The space and time complexity of this algorithm is $O(m^2)$, where m is the length of the stack.

LCS

The LCS based similarity is proposed in [2]. Here we review the algorithm briefly. In LCS algorithm the similarity score between two call stacks is based on longest common subsequence alignment cost which is a function of selectivity of functions, their positions from the top of the stack and gap penalty which increases exponentially with the extent of gap. (In this invention, substitutions in the sequences are not allowed but are instead replaced by combinations of sequences including gaps. For example, if comparing the sequence AATT against AGTT, where the second A is substituted with a G, this is interpreted as comparing sequence AA_TT against A_GTT, where _ symbolizes a gap.) The alignment cost can be computed using a dynamic programming formulation. The similarity score is obtained from the alignment cost as in Equation (2). The space and time complexity of computing LCS based similarity is $O(m^2)$, where m is the length of the stack.

Prefix Match

This algorithm is based on the basic premise that two call stacks resulted due to the same problem will have the same function names at the top of the stacks. In this algorithm we find the longest common prefix by counting the number of consecutive functions starting from the top of the stacks that match across the two stacks. The size of this longest common prefix, normalized to the length of the longer of the two stacks, is taken as the similarity score of the two call stacks. More formally, let S and T be the two call stacks. Then the similarity score based prefix match, $S_p(S,T)$, is, $$S_p(S, T) = \frac{\operatorname{argmax}_i \{S_i : S_i = T_i\}}{\max(|S|, |T|)} \quad (3)$$

The space and time complexity of this algorithm is linear in the length of the stack, i.e., O(m). This algorithm can also take advantage of a lexicographically sorted list of call stacks to search the matches in O(m log n) time, where n is the number of call stacks in the list.

Stack Normalization

As mentioned earlier, it is important to normalize the stacks by removing recursion and uninformative function names before applying the stack matching algorithms. We now present techniques for identifying recursion and uninformative functions, and removing them.

Recursion Removal

Figure 3A:
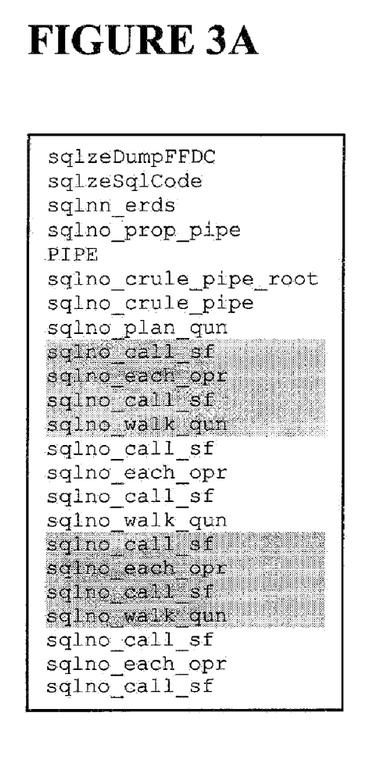
FIG. 3A is a diagram of a call stack with recursion and FIG. 3B is a diagram of a call stack after removing recursion, according to an embodiment of the invention.
Figure 3B:
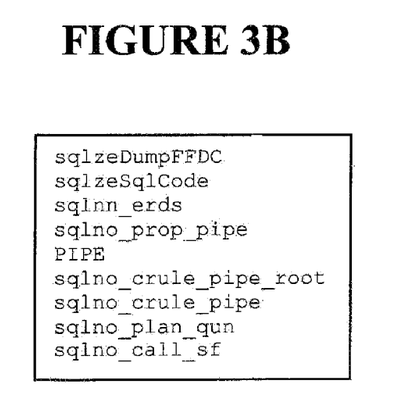

Recursive call sequences occur often in call stacks. Referring now to FIG. 3A, an example call stack from IBM DB2 is shown where, starting from top, a sub-sequence (sqlno_call_sf, sqilno_each_opr, sqlno_call_sf, sqlno_walk_qun) is repeated three times, followed by the subsequence (sqlno_call_sf, sqlno_each_opr, sqlno_call_sf). The number of repetitions is typically dependent on the input parameter values. Since we are not considering input parameters to match problem symptoms, we remove recursion in the incoming function call stacks before using them for matching. FIG. 3B shows the stacks after recursion is removed.

Recursion removal algorithm is based on the fact that if a function appears multiple times in the call-stack then whatever happens between two calls to that function is not important from the problem determination point of view. In this example, a call to sqlno_call_sf leads to a number of recursive calls to the same function before it calling the sqlno_plan_qun which leads to system crash. From our point of view it is not important that sqlno_walk_qun and sqlno_each_opr functions were also invoked between two outermost calls to sqlno_call_sf, neither the fact that some of the functions were invoked multiple times.

For removing recursion we keep two pointers: one starts from the top of the stack and another from the bottom of the stack. If the function names at two pointers are matching then all the function names appearing between the top pointer and the bottom pointer, including the one at the bottom, are removed from the processed stack. In this case, the resulting stack is again searched for presence of recursion.

Figure 4:
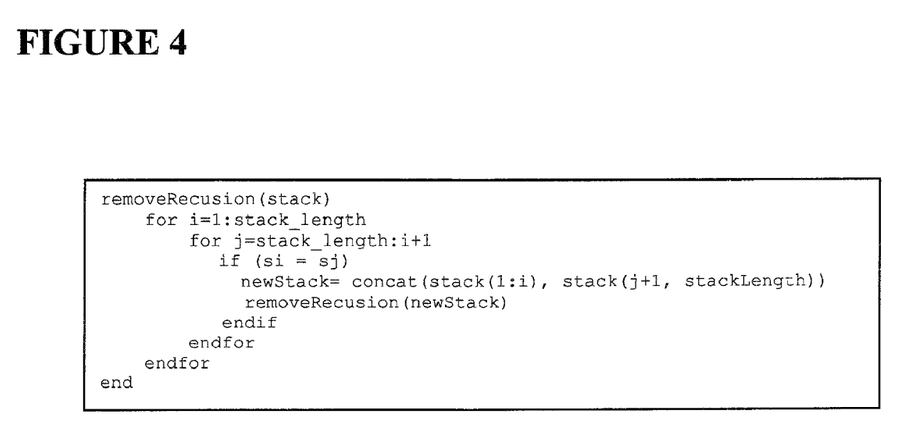
FIG. 4 is a diagram of the recursion removal algorithm, according to an embodiment of the invention.

Referring now to FIG. 4, the outline of the recursion removal algorithm is shown. The concat function creates a function sequence from the two input sequences by putting the second sequence below the first. The processed stack is used as input for iteratively applying the algorithm until we have all distinct function names in the processed stack. Our scheme removes recursion which the scheme in [2] fails to remove. For example, for stacks of form abbbabbab (where a, b are two function names) the recursion removal algorithm given in [2] will result in ababab whereas our algorithm would reduce it to ab; which is arguably a better representation. Furthermore, complexity of this algorithm is $O(gm^2)$, for stack length m and number of functions appearing multiple times in the call stack g; whereas that for the algorithm presented in [2] is $O(m^3)$. In practice, g is likely to be much smaller compared to m (and can not be more than m/2), therefore improving the complexity of the algorithm presented in [2], which was $O(m^3)$.

Uninformative Functions

As discussed earlier, the functions at the very top of the stack maybe uninformative ones, which if not removed, can degrade the performance of the stack matching algorithms. The reason is two-fold. First, the functions within a module tend to use the same error handling routines and hence, if the stack matching gives higher weight to the top of the stack (which our schemes do), it would lead to more false positives. Second, sometimes the functional code may not change, but the error handling may change from one version to the other. This means that even though the function where the error is encountered remains the same, the top of the stack may change, which would lead to more false negatives. This indicates that removing such error handling function names from the stack is an important preprocessing step for the stack matching. One can get a list of such functions from the domain expert, but for commercial size software, it is very difficult for even the experts to provide such a list accurately. Hence there is a need for automatically detecting such function names from the call stacks. Below we present schemes for this purpose.

Function Frequency (FF) Algorithm

This scheme is inspired by the document frequency based feature selection technique in the information retrieval domain. We find the frequency of occurrence of each function name across all the call stacks. A threshold is set and all the functions having occurrence frequency greater than the threshold are considered as uninformative functions. Alternatively, one could also take the k most frequent functions and consider them as the uninformative functions. In our experiments, we take the second approach (with different values of k) as there is no natural choice for the threshold.

Supervised Learning (SL) Algorithm

The document frequency based statistical approach, while useful for information retrieval, may not be best suited for the purpose of stack matching. It can identify a function name as error reporting function if the function has many reported problems. More importantly, if a component does not have a large number of problems reported, the FF algorithm can not find the uninformative functions for that component.

Here, we propose a supervised learning scheme, which can detect the uninformative function names quickly and more reliably. Inputs to this scheme are a set of PMRs problem descriptions) along with their corresponding APARs (problem resolutions). As explained earlier, if two PMRs have the same corresponding APARs, they (and stacks extracted from them) can be considered to be duplicate of each other. Thus we have pairs of call stacks along with 'ground truth' indicating whether they are duplicate of each other or not. In this scheme, three counters are maintained for each of function names. All the counters are initialized to 0.

1. False Positive Count (FPC): $FPC_f$ is incremented for all the matching function names $f$ which are appearing above the first non-matching function name in a call-stack pair generated due to different problems. If the entire stack is identical, we increase the $FPC_f$ for all the functions $f$ in the stack.

2. False Negative Count (FNC): $FNC_f$ is incremented for all the non-matching function names $f$ which are appearing above the first matching function in a call-stack pair generated due to the same problem. If there are no matching functions, we increase the $FNC_f$ for all the functions $f$ in the two stacks.

3. Frequency Count (FC): $FC_f$ is incremented for each appearance of a function $f$ in any function call stack.

An aggregate measure ($AM_f$) is defined as a non-decreasing function of $FPC_f$, $FNC_f$ and $FC_f$ for each function name. Functions having higher aggregate measure are likely to be uninformative functions. We chose:

$$AM_f = \frac{FPC_f}{FPC_{max}} + \frac{FNC_f}{FNC_{max}} + \frac{FC_f}{FC_{max}} \quad (4)$$

Since this algorithm takes into account usefulness of the function name in deciding the duplicate problems, it performs better than the function frequency algorithm as showcased in the experimental results later on.

Indexing

Indexing is used in databases to improve search performance. It reduces number of rows to which possibly complex filter is applied. For call-stack matching, various matching algorithms were described in Section 0. If n stacks are stored in the repository, the complexity of these matching algorithms will be either O(nm) for the prefix matching algorithm or O(nm²) for the others. By using efficient indexing we can reduce the effective value of n to improve the response time. While indexing one need to ensure that any potentially matching stack does not get rejected at the indexing stage. Thus we need to decide upon a key on which to index, so that the indexing step will return a superset of call-stacks, which are likely to match with the given query stack.

The solution to the above indexing problem is non-trivial since there is no well established definition of stack similarity measure, as we ourselves have presented three different measures for this purpose. In traditional databases, indexes may be created for a particular filtering condition. For example, hash based indexes cannot be used efficiently for inequality or range queries. We propose two methods of indexing having different properties to reflect the differences of approach followed by the different matching algorithms.

Top-k Indexing

This algorithm is based on the intuition that two call stacks are likely to be due to the same problem if the top of the stacks is same. We store a hash key of the top-k function names for each stack in the repository. When a query stack arrives, we compute the hash of the top-k function names from it and query the repository for stacks that have the same hash key. The value of k can be chosen to control the number of candidates returned by the indexing scheme. While this scheme will not result infalse-negatives for the prefix match algorithm, it may result in false-negatives for the LCS and edit distance based matching algorithms, as similarity score based on these algorithms may be reasonably high even if the top of the stack does not match.

In the help desk scenario explained above, the service personnel (L1) are presented a fixed number of results by the matching algorithm. In this situation, this indexing scheme can be further tuned to use the appropriate value of k automatically to minimize the number of stacks that need to be considered by the matching algorithm, thereby reducing the query response time.

Figure 5:
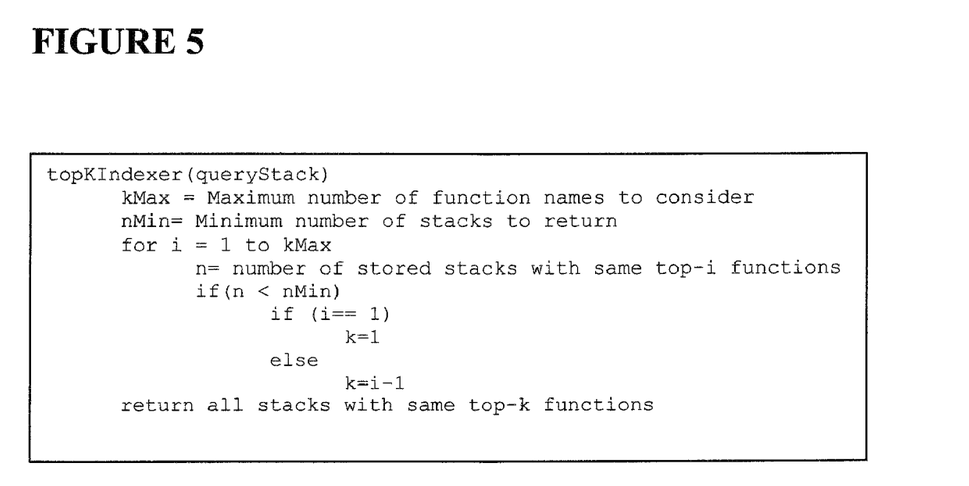
FIG. 5 is a diagram of the top-k based indexing algorithm, according to an embodiment of the invention.

Let nmin be the number of results required, then the indexing scheme need to return at least nMin stack ids. Referring now to FIG. 5, a sketch of this indexing algorithm is shown. In this algorithm, kMax is the maximum number of function names which will be used for indexing. We start with k=1 and return stored stacks having the same top-k functions as query stack such that k is maximum but number of stacks returned is more than nMin.

Inverted Index

This algorithm is based on the observation that if a stack in the repository does not contain 'enough' function names which also appear in the query stack, it can not get a high score from the matching algorithms. If we maintain a mapping from the function names to the stacks in which they appear, we can look it up to find the stacks that have a minimum number of functions present in the query stack. The mapping can be implemented using a hash table with the function names as the key and list of stack identifiers which contain this function as the value. As a new stack is stored in the repository, its id can be appended to the lists of stacks for all the functions appearing in the stack. If a new function name is encountered then a new entry is created for that function name and the incoming stack id is added as the stack list. Given a query stack which can be treated as a sequence of function names, the hash table is searched for each function name appearing in the query sequence and a multi-set is created with the corresponding stack-ids. The indexing algorithm returns all the stacks which are appearing in the multi-set more often than a threshold T.

We measured the performance using various matching algorithms, indexing schemes and uninformative informative function removal schemes using the prototype architecture.

Performance Measurement

The effectiveness of various steps of stack matching shown in FIG. 2 is now described. Real-world data is used for performance measurement.

Data Collection

The experiments were conducted using stack traces from IBM DB2, an industry leading database product. When DB2 crashes or encounters a hang situation, it generates a 'trap' file, which among other things, contains the call stack trace. Typically, the customers submit this trap file along with other symptoms of the problem. This information is captured in a PMR. DB2 service team maintains a database, named RFTAIN, of PMRs and APARs [1]. When a new problem is reported, this database is searched for the APARs that may solve the problem reported by this PMR. If such an APAR is found the customer is informed about it (and the PMR is closed), else a new APAR is created and the problem is solved by service personnel.

We collected 525 PMRs and the corresponding APARs from the RETAIN database such that each of these PMRs contained a call-stack. For the purpose of establishing the ground truth for our experiments, two PMRs are considered to be duplicates of each other if they refer to the same APAR. In the real life scenario of a help desk, one can find the duplicates only from the previously reported PMRs. This implies that $PMR_1$ is not counted as the duplicate of $PMR_2$ if $PMR_2$ arrives before $PMR_1$. Based on the above assertion, 208 PMRs had at least one duplicate PMR reported earlier. The total number of duplicates was 568. This actually indicates that some of the problems are reported many times. This formed our experimental data set.

We found that these problem records had 461 distinct call stacks (prior to normalization). Out of these 461 stacks, 142 stacks had recursion. This illustrates the need for recursion removal, as otherwise, the similarity score would not be true indicator of stack similarity.

Experiment Methodology and Parameters of Importance

The objective of call stack matching is to search problems reported earlier that are potentially the same as the newly reported problem. For our performance measurement experiments, we started with an empty repository. We fired the stacks corresponding to the problem records as queries in the order of their arrival to RETAIN. We searched for similar stack in the repository by setting a threshold on the similarity score. All problems corresponding to the stacks (from repository) that have a similarity score higher than the threshold are deemed to be duplicates according to the algorithm in question. We count the number of results returned and the correct results among them which are used to calculate performance parameters as explained later. After the query is performed, the problem record is inserted into the repository, thereby making it available for matching for future queries. We repeated the experiments by setting different threshold and for different algorithms. As any document search algorithm, stack matching algorithms may return problem records which are not duplicates, and it may miss some problem records which are duplicates based on the ground truth. Hence, as in the information retrieval domain, a natural way to measure the performance of the matching algorithms is in terms of average precision and recall, which we define below.

Let n be the total number of results returned by the matching algorithm for all the queries, d be the number of (actual) duplicates amongst these returned results and D be the total number of duplicates in the data set. We define average precision (p) and the average recall (r) as:

$$p = \frac{d}{n} \text{ and } r = \frac{d}{D}$$

We will call average precision and average recall as precision and recall for brevity. Precision indicates the fraction of results returned which are actually duplicates of the query problem. Recall indicates the fraction of duplicates discovered by the matching algorithm.

Comparison of Matching Algorithms

Figure 6:
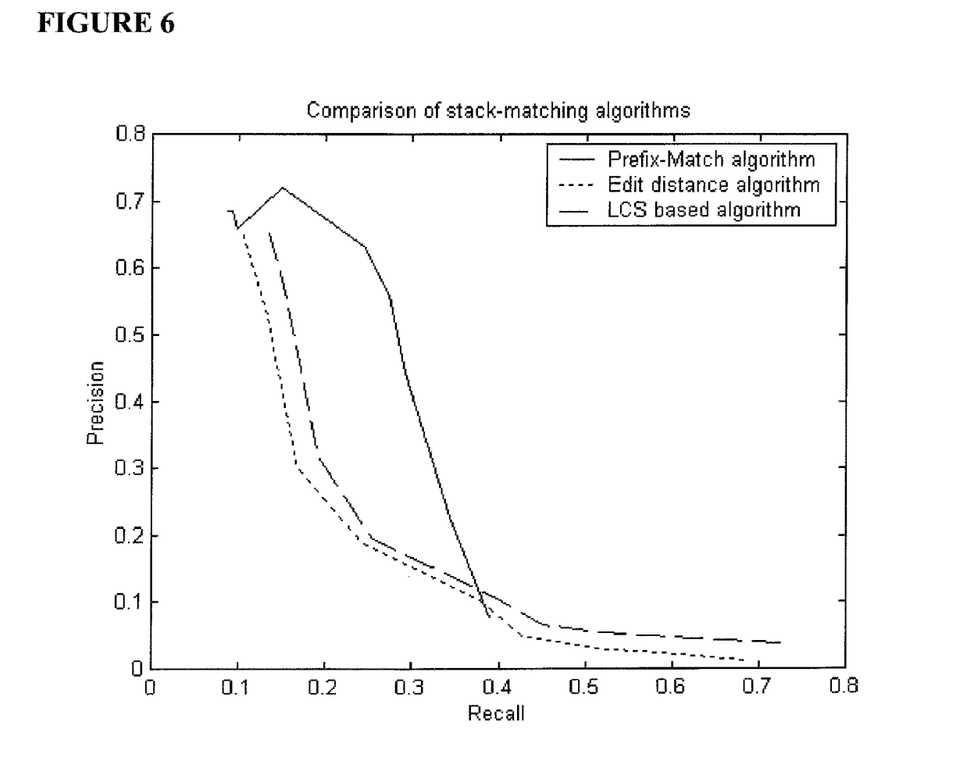
FIG. 6 is a diagram of a comparison of stack matching algorithms, according to an embodiment of the invention.

First, we look at the performance of the three matching algorithms presented. In this experiment, while the recursion has been removed, we did not remove any uninformative function names. Referring now to FIG. 6, the precision versus recall plot for the three matching algorithms is shown. As expected, largely, the precision can be traded for higher recall.

There are two observations worth mentioning here. First, no matter how high the threshold is, it is not possible to achieve a precision of 100%. The reason being, when a function has more than one error in it, while the stacks are identical, the problems are not the same. The other observation is that no matter how low the threshold is, it is not possible to achieve a recall of 100%. This has a more subtle explanation. Whenever the system encounters a memory corruption related problem, the stack is not a true indicator of the problem. In fact, quite often when the memory related problems occur, the stack trace generated is not even a theoretically possible path in the program execute flow. Such cases can potentially be solved by first checking the program call flow graph and checking if the call stack is a valid call stack. If not, the stack matching technique will not be useful, but the issue can be identified as a memory related problem.

Referring again to FIG. 6, the results with all the stacks are shown where one obtains maximum recall of 35% with 55% precision, which can be a good operating point. If we discard the stack pairs that correspond to the memory related problems (about 25% of duplicate cases), the recall increases by about 33% for each of the algorithms. In this case, maximum obtained recall for 55% precision is 47%. There is no significant change in the precision values and shape of the curves; hence in the rest of this section, we present results with all the stacks.

The prefix match algorithm has higher precision for the same recall values than the edit distance and LCS based algorithms, although it does not achieve a recall higher than 40%. While in theory, the LCS and Edit Distance based algorithms can achieve a recall up to 70% but for any recall higher than 50%, the corresponding precision drops below 5%, rendering them unusable. Also, the performance of the edit distance based algorithm and the LCS algorithm does not seem to be very different. Hence, from here on, we present results only for LCS and prefix match algorithms for clarity.

Effectiveness of Indexing

We have presented two indexing schemes. The top-k based scheme is expected to speed up the query processing significantly. It will not change the precision and recall values for the prefix match algorithm (for k=1) but may lead to increase in false-negatives (D-d) for the LCS based algorithm, as explained earlier, thereby reducing its recall. The inverted index approach can be used with either matching algorithm without affecting their precision and recall (with threshold T=1). However, in this case, the speed up is not expected to be as much as the top-k based approach.

Since the query response time is more important in the help desk scenario, we simulated that scenario in our experiments by asking the matching algorithms to provide at most 5 recommendations for each query (instead of setting a threshold on similarity score). Of course, if there were less than 5 problem records in the repository which have a non-zero similarity score, the matching algorithms will return fewer results. The response-time as well as precision and recall are shown in Table 1.

TABLE 1

Effect of indexing on stack matching algorithms

| Matching Algorithm | Resp. Time (msec.) | Precision | Recall |
|---|---|---|---|
| Prefix Match (no indexing) | 1813.00 | 62.81% | 36.53% |
| Prefix Match with Top-K indexing | 2.04 | 62.81% | 36.53% |
| Prefix Match with Inverted Index | 154.00 | 62.81% | 36.53% |
| LCS (no indexing) | 1888.00 | 52.69% | 42.31% |
| LCS with Top-K indexing | 2.13 | 60.34% | 39.90% |
| LCS with Inverted Index | 157.00 | 52.69% | 42.31% |

The schemes with top-k indexing are almost two orders of magnitude faster than that the ones without indexing whereas the inverted index scheme leads to a speed-up by a factor of about 12. Further, response times of prefix match and LCS with the same indexing schemes are approximately same. Both the observations can be explained from the fact that the response time is dominated by disk access time. As candidates returned by the top-k indexing will be subset of that returned by the inverted index (for corresponding values of k and T), top-k indexing is faster.

While the recall reduction for the LCS matching algorithm when used in conjunction with top-k based indexing was expected, the improvement in the precision is not so obvious. It is due to the fact that by discarding the stacks with mismatch right at the top, we discard most of the stacks corresponding to the non-duplicate problems.

Effectiveness of Uninformative Functions Removal

Figure 7:
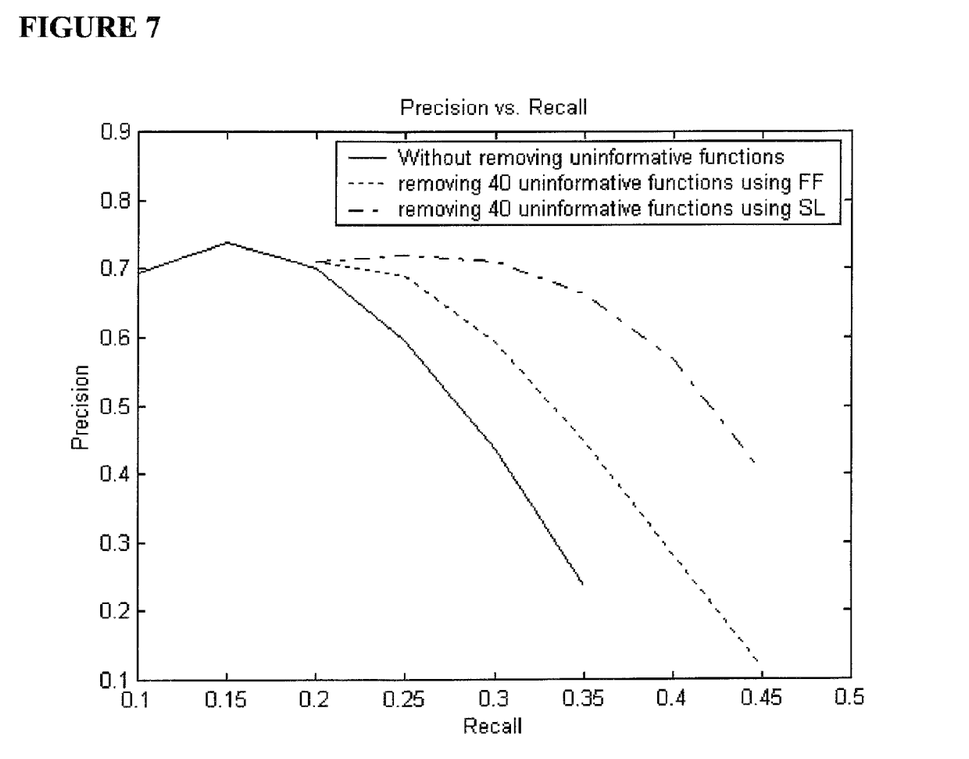
FIG. 7 is a diagram of a comparison of the uninformative function name removal algorithms, according to an embodiment of the invention.

As explained previously, removing uninformative functions from the top of the stack is likely to improve precision and recall of stack-matching algorithms. Referring now to FIG. 7, the performance of the prefix match improves by removing uninformative function names using either of the algorithms presented earlier. Compared to FIG. 5, where recall values of prefix match are less than 40%, by removing uninformative functions, recall of 45% can be achieved. Similar improvements were observed with other stack matching algorithms also. Also note that the supervised learning algorithm performs better than the frequency based statistical approach as it results in more than 20% better precision for the same value of recall.

Figure 8:
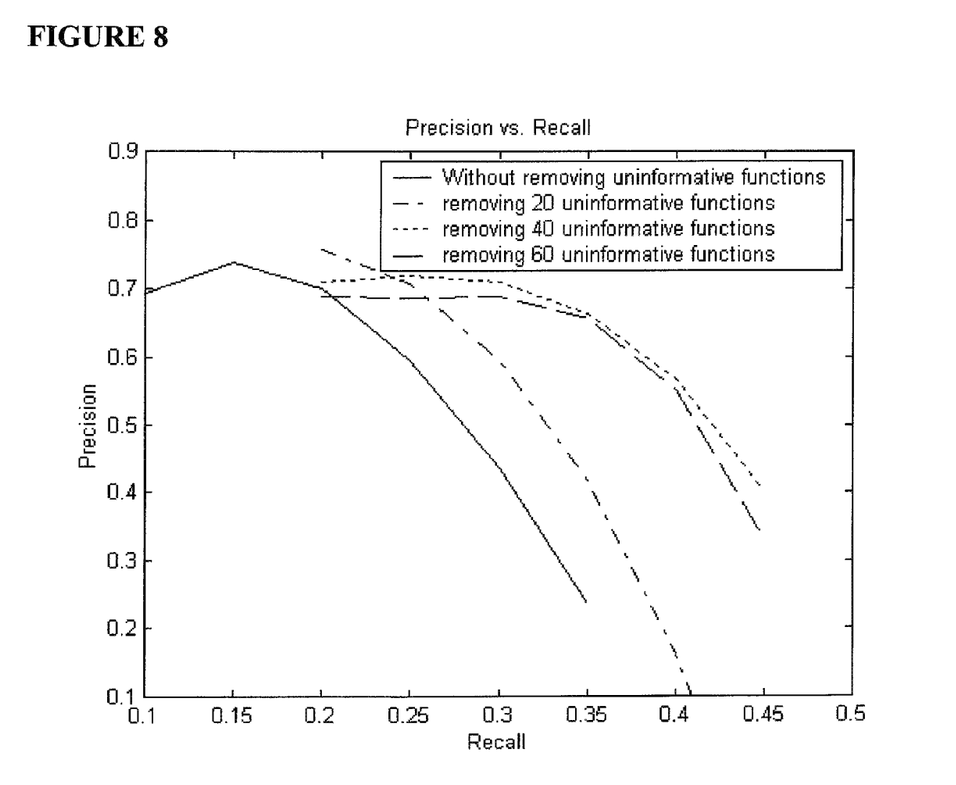
FIG. 8 is a diagram of the performance of prefix match with varying percentages of uninformative function names removed, according to an embodiment of the invention.

Referring now to FIG. 8, the precision versus recall curves are shown for the prefix match algorithm with the supervised learning scheme for uninformative function name removal. Experiments were performed while removing 20, 40 and 60 function names. The performance improves progressively from no uninformative function name removal to 40 function names. However, the improvement is not evident from the case when 40 functions are removed to the case when 60 functions are removed. It can be explained from the fact that as more functions are removed, more distinguishing functions gets removed assuming them to be uninformative, which may lead to reduction in precision. In general, uninformative functions removal increases recall values, but for very short stacks, if large number of functions are removed, recall may reduce.

CONCLUSION

We presented various components of call stack matching for the purpose of identifying similar problems reported earlier, thereby reducing the effort and skill level required to resolve the repeated occurrences of the same software problem. We presented new algorithms for stack matching, recursion removal, identifying the uninformative function names and indexing to speed up the stack matching process. We also provided experimental results using the real world data in realistic settings to illustrate the usefulness of our techniques.

A general purpose computer is programmed according to the inventive steps herein. The invention can also be embodied as an article of manufacture—a machine component—that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the particular SYSTEM AND METHOD FOR MATCHING A PLURALITY OF ORDERED SEQUENCES WITH APPLICATIONS TO CALL STACK ANALYSIS TO IDENTIFY KNOWN SOFTWARE PROBLEMS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

REFERENCES

1. Michael Buckley and Ram Chillarege, "Discovering relationships between service and customer satisfaction", IEEE International Conference on Software Maintenance (ICSM), 1995.
2. Mark Brodie et al., "Quickly Finding Known Software Problems via Automated Symptom Matching", IEEE International Conference on Autonomic Computing (ICAC), 2005.
3. Levenshtein V.I., "Binary codes capable of correcting deletions, insertions and reversals", Soviet Physics Doklady 10(8), pp. 707-710.
4. Brodie, M., Ma, S., Rachevsky, L, and Champlin, J., "Automated Problem Determination using Call-Stack Matching", Journal of Network and Systems Management, special issue on self-managing systems, June 2005.
5. Feng, H. H., Kolesnikov, O., Fogla, P., Lee, W. and Gong, W., "Anomaly Detection Using Call Stack Information", Proceedings of the 2003 IEEE Symposium on Security and Privacy, 2003, pg 62.
6. Lambert J. and Podgurski, A., "xdProf: A Tool for the capture and analysis of stack traces in a distributed Java system", International Society of Optical Engineering (SPIE) Proceedings, Volume 4521, 2001, pg 96-105.
7. Acorn, T., and Walden, S., SMART: Support Management Reasoning Technology for Compaq Customer Service, Innovative Applications of Artificial Intelligence, Volume 4, 1992.
8. Li, T., Zhu, S., and Ogihara, M., Mining Patterns from Case Base Analysis, Workshop on Integrating Data Mining and Knowledge Management, 2001.
9. Navarro G. et al, "Indexing Methods for Approximate String Matching", Bulletin of the IEEE Computer Society Technical Committee on Data Engineering, 2001.
10. Altschul S. F., W. Gish, W. Miller, E. W. Myers, and D. J. Lipman, "Basic local alignment search tool," J. Molecular Biology 15 (1990), 403-410.

We claim:

1. A computer-implemented method of finding a subset of candidate ordered sequences of symbols that match a query ordered sequence, the method comprising:
    obtaining relative importance weights of symbols in the candidate ordered sequences;
    finding a maximum match among the candidate ordered sequences by optimizing a weighted similarity measure;
    pruning uninformative sequences based on a false positive count, a false negative count, and a frequency count;

incrementing the false positive count for all matching function names appearing above a first non-matching function name in a call-stack pair generated due to the same problem, and incrementing the false negative count for all non-matching function names appearing above the first matching function in the call-stack pair generated due to the same problem; and incrementing the frequency count for each appearance of either one of the matching or one of the non-matching functions in the call stack.

2. The method of claim 1 further comprising removing repeating patterns of symbols within the candidate ordered sequences by replacing at least one repeating pattern of symbols with a single instance of the symbol that was repeated;

pruning candidate ordered sequences known to occur frequently from the candidate ordered sequences; and eliminating candidate ordered sequences unlikely to match the query ordered sequence.

3. The method of claim 2 wherein the method matches candidate ordered sequences in program function call stacks to identify similar known software error conditions and each function name in the call stack is treated as a symbol for matching.

4. The method of claim 2 wherein uninformative subsequences comprise at least one of candidate ordered sequences known to occur frequently, generic error handling program functions, entry-level program functions common across a plurality of call-stacks, and combinations thereof.

5. The method of claim 2 wherein uninformative subsequences are identified from at least one of a list of uninformative sequences, a list of informative sequences, symbols occurring with a frequency greater than a predetermined threshold, and combinations thereof.

6. The method of claim 2 wherein the pruning further comprises creating an index of ordered sequences using symbols as a key and all the sequences in which the symbol occurs as its values, and identifying candidate sequences using the index of ordered sequences.

7. The method of claim 2 wherein the pruning further comprises creating an index of ordered sequences using a hash function of the first k symbols.

8. The method of claim 7 further comprising finding ordered sequences from the index having the same value of the hash function.

9. The method of claim 2 wherein after the step of eliminating, symbols at the top of the current candidate ordered sequence are weighted as more important in the weighted similarity measure, and symbols common across a plurality of former candidate ordered sequences at the bottom of the current candidate ordered sequence are weighted as less important in the weighted similarity measure.

10. The method of claim 1 wherein the step of finding a maximum match includes at least one of: edit distance method, Longest Common Sub-sequence alignment method, prefix match, and combinations thereof.

11. The method of claim 1 further comprising replacing query symbols in the candidate ordered sequences which substitute symbols in the query ordered sequences with combinations of sub-sequences including gaps.

12. The method of claim 11 wherein the weighted similarity measure penalizes the gaps exponentially.

13. The method of claim 1 wherein the weighted similarity measure depends on at least one of: distance between two symbols, position of a query symbol in the sequence, and symbol weights.

14. The method of claim 1 wherein the finding further comprises indexing sequences according to weighted similarity measures that exceed a predetermined threshold.

15. The method of claim 2 further comprising responsively selecting a corresponding predetermined customer software error solution, including a bugfix comprising a fix or patch for the software error condition.

16. The method of claim 1 wherein the method matches query sequences in O(m) time where m denotes the length of the candidate ordered sequence.

17. A computerized system for finding a subset of candidate ordered sequences of symbols that match at least one query ordered sequence, comprising:

a pattern remover executed by a computer processor to remove repeating patterns within the candidate ordered sequences a sequence pruner to prune candidate ordered sequences known to occur frequently from the candidate ordered sequences, and to prune uninformative sequences based on a false positive count, a false negative count, and a frequency count, wherein a false positive count is incremented for all matching function names appearing above the first non-matching function name in a call-stack pair generated due to the same problem, and wherein a false negative count is incremented for all non-matching function names appearing above the first matching function in a call-stack pair generated due to the same problem; and wherein the frequency count is incremented for each appearance of either one of the matching or one of the non-matching functions in the call stack;

a sequence eliminator to eliminate candidate ordered sequences unlikely to match the at least one query ordered sequence;

a weight evaluator to obtain relative importance weights of symbols in the candidate ordered sequences; and a match finder to find a maximum match that is not a duplicate among the candidate sequences by optimizing a weighted similarity measure.

18. A computer program product comprising a machine readable storage medium tangibly embodying program instructions for finding a subset of candidate ordered sequences of symbols that match the query ordered sequence thereon, the instructions comprising:

computer program code to remove repeating patterns within the candidate ordered sequences;

computer program code to prune candidate ordered sequences known to occur frequently from the candidate ordered sequences;

computer program code to prune uninformative sequences based on a false positive count, a false negative count, and a frequency count, wherein a false positive count is incremented for all matching function names appearing above the first non-matching function name in a call-stack pair generated due to the same problem, and wherein a false negative count is incremented for all non-matching function names appearing above the first matching function in a call-stack pair generated due to the same problem; and wherein the frequency count is incremented for each appearance of either one of the matching or one of the non-matching functions in the call stack;

computer program code to eliminate candidate ordered sequences unlikely to match the at least one query ordered sequence;

computer program code to obtain relative importance weights of symbols in the candidate ordered sequences; and computer program code to find a maximum match among the candidate sequences by optimizing a weighted similarity measure.

19. A method of performing a commercial service that provides a user with a fee-selectable opportunity to find a subset of candidate ordered sequences of symbols that match at least one query ordered sequence by:

removing repeating patterns by execution of a computer processor within the candidate ordered sequences;

mapping functions with a hash table to the candidate ordered sequences in which the functions appear;

pruning candidate ordered sequences known to occur frequently from the candidate ordered sequences, wherein a predetermined number of most frequently occurring functions are removed from the candidate ordered sequences;

eliminating candidate ordered sequences unlikely to match the query ordered sequence;

obtaining relative importance weights of symbols in the candidate ordered sequences; and finding a maximum match among the candidate sequences by optimizing a weighted similarity measure, in consideration for a fee.

\* \* \* \* \*